United States Patent
Beser (10) Patent No.: US 8,605,747 B2
(45) Date of Patent: *Dec. 10, 2013

(54) USING DEDICATED UPSTREAM CHANNEL(S) FOR CABLE MODEM INITIALIZATION

(75) Inventor: Nurettin Burcak Beser, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 246 days.

This patent is subject to a terminal disclaimer.

(21) Appl. No.: 13/113,166

(22) Filed: May 23, 2011

(65) Prior Publication Data

US 2011/0222558 A1  Sep. 15, 2011

Related U.S. Application Data

(63) Continuation of application No. 10/890,383, filed on Jul. 14, 2004, now Pat. No. 7,978,723.

(60) Provisional application No. 60/486,910, filed on Jul. 15, 2003.

(51) Int. Cl.
  *H04J 3/16* (2006.01)
  *H04J 3/22* (2006.01)
  *G06F 15/173* (2006.01)
  *H04N 7/16* (2011.01)
  *H04N 7/173* (2011.01)

(52) U.S. Cl.
  USPC ........... 370/468; 370/477; 725/111; 725/144; 709/226

(58) Field of Classification Search
  None
  See application file for complete search history.

(56) References Cited

U.S. PATENT DOCUMENTS

| | | | |
|---|---|---|---|
| 6,177,906 B1* | 1/2001 | Petrus | 342/378 |
| 6,230,326 B1* | 5/2001 | Unger et al. | 725/111 |
| 6,456,604 B1 | 9/2002 | Lee et al. | |
| 6,940,874 B2 | 9/2005 | Ruszczyk et al. | |
| 7,359,434 B2 | 4/2008 | Shahar et al. | |
| 7,673,140 B2* | 3/2010 | Evoy | 713/168 |
| 7,978,723 B1* | 7/2011 | Beser | 370/431 |
| 2002/0062486 A1* | 5/2002 | Park | 725/111 |
| 2002/0101883 A1* | 8/2002 | Ruszczyk et al. | 370/503 |
| 2003/0035442 A1 | 2/2003 | Eng | |
| 2004/0014482 A1 | 1/2004 | Kwak et al. | |
| 2005/0025145 A1 | 2/2005 | Rakib et al. | |
| 2006/0040708 A1 | 2/2006 | Steele et al. | |

OTHER PUBLICATIONS

Copending U.S. Appl. No. 10/890,383 filed Jul. 14, 2004 entitled "Using Dedicated Upstream Channel(s) for Cable Modem Initialization" by Beser, 31 pages.

* cited by examiner

*Primary Examiner* — Xavier Szewai Wong
(74) *Attorney, Agent, or Firm* — Harrity & Harrity, LLP (57) ABSTRACT

A system facilitates initialization of devices in a cable modem network. The system may provide downstream channels for transmitting data to the devices and upstream channels for receiving data from the devices. At least one of the upstream channels may be dedicated to providing initialization opportunities. This dedicated upstream channel(s) includes less than all of the upstream channels. The system may transmit upstream channel identifiers on the downstream channels, where each of the upstream channel identifiers identifies one of the upstream channels. The system receives initialization data on the dedicated upstream channel(s).

20 Claims, 7 Drawing Sheets

USING DEDICATED UPSTREAM CHANNEL(S) FOR CABLE MODEM INITIALIZATION

RELATED APPLICATION

This application is a continuation of U.S. application Ser. No. 10/890,383, filed Jul. 14, 2004, which is a non-provisional of U.S. Provisional Application No. 60/486,910, filed Jul. 15, 2003, the disclosures of which are incorporated herein by reference.

BACKGROUND

1. Field of the Invention

Systems and methods consistent with the principles of the invention relate generally to data communication and, more particularly, to data communication within cable modem systems.

2. Description of Related Art

In cable modem systems, a cable modem termination system (CMTS) at one end of a cable network typically services multiple cable modems (CMs) connected to the cable network. CMs are generally installed locally at the end-user's location, and communicate with the CMTS, which may be installed at a cable company's facility. The CMTS transmits data and messages to the CMs in a "downstream" direction and receives data bursts from the CMs in an "upstream" direction.

Data over Cable Service Interface Specification (DOCSIS) is a commonly used communications protocol that defines interface requirements for CMs. DOCSIS 2.0, for example, builds upon the capabilities of DOCSIS 1.0 and DOCSIS 1.1 and adds throughput in the upstream portion of the cable system. This increased upstream data capacity enables symmetrical and time-critical services such as videoconferencing and peer-to-peer applications. When sharing a communication channel with a CMTS, the CMs may use modulation schemes in which the modems transmit data bursts to the CMTS during designated time intervals.

CMTSs typically receive data though a number of physical ports and further distinguish between different frequencies or "channels" of data using a number of internal receivers. Current CMTSs typically have a fixed relationship between their internal receivers and the physical ports.

Certain data communication, such as voice over Internet protocol (VoIP), may require data blocks to be transmitted on an upstream channel on a periodic basis, such as once in every 10 ms, 20 ms, or 30 ms time interval. The same time period may be allocated to the data communication within each time interval. It is important to use each upstream channel as fully as possible. Therefore, data blocks from different data communications may be packed together as much as possible.

CM initialization requires that certain information be communicated from the CMs to the CMTS on the upstream channels. As a result, CM initialization requires a lot of bandwidth, thereby limiting the amount of data communication that can occur on the upstream channels.

CM initialization includes two characteristics: initial maintenance and registration. For initial maintenance, the CMTS allocates a certain portion of every time interval for initialization of CMs. For example, the CMTS allocates 1.6 ms within each 10 ms time interval for initialization of a CM. During registration, a CM transmits a large packet (e.g., 1500 byte registration packet) to the CMTS. The packet must be transmitted without any disturbances and cannot be fragmented.

CM initialization may not occur during every time interval. The CMTS, nevertheless, must allocate a portion of each time interval for CM initialization. For example, a 1.6 ms period of each time interval may be dedicated to CM initialization, leaving an 8.4 ms period for other data communication. When the 1.6 ms period is not used for CM initialization, then this period is wasted, leading to an inefficient use of upstream channel bandwidth.

Accordingly, there is a need to more efficiently use upstream channel bandwidth in cable modem systems.

SUMMARY

Systems and methods consistent with the principles of the invention address this and other needs by dedicating one upstream channel for use in cable modem initialization. The remaining upstream channels remain free to handle data communications.

In accordance with one aspect of the invention as embodied and broadly described herein, a method for initializing devices in a cable modem system is provided. The method, which is performed by at least one of the devices, includes receiving upstream channel identifiers on downstream channels. Each of the upstream channel identifiers identifies one of a group of upstream channels. At least one of the upstream channels is dedicated to providing initialization opportunities. The at least one upstream channel includes less than all of the upstream channels. The method also includes reading from a first one of the upstream channels identified by a first one of the upstream channel identifiers, determining whether the first upstream channel is the at least one upstream channel that provides initialization opportunities, and performing initialization when the first upstream channel is the at least one upstream channel.

According to another aspect, a system for initializing devices in a cable modem network is provided. The system may provide downstream channels for transmitting data to the devices and upstream channels for receiving data from the devices. At least one of the upstream channels is dedicated to providing initialization opportunities. The system may also transmit upstream channel identifiers, which identify the upstream channels, on the downstream channels and receive initialization data on the at least one upstream channel.

According to yet another aspect, a cable modem termination system includes input ports and receivers connected to the input ports. The input ports are configured to receive data on upstream channels from multiple cable modems. At least one of the upstream channels is dedicated to receiving initialization data from the cable modems. The at least one upstream channel includes less than all of the upstream channels. The receivers are configured to process the data, including the initialization data, from the cable modems.

According to a further aspect, a cable modem termination system includes input ports and receivers connected to the input ports. The input ports are configured to receive data associated with multiple upstream channels. One of the upstream channels may transport initialization data and others of the upstream channels may transport no initialization data. The receivers correspond to the upstream channels and are configured to process the data received by the input ports.

According to another aspect, a cable modem system includes a cable modem termination system connected to multiple cable modems via upstream channels and downstream channels. The cable modem termination system is configured to provide initialization opportunities for the cable modems on at least one of the upstream channels, where the at least one upstream channel is dedicated to handling cable modem initialization. The cable modem termination system is further configured to transmit upstream channel identifiers on the downstream channels, where each of the upstream channel identifiers identifies one of the upstream channels. The cable modem termination system is also configured to receive initialization data on the at least one upstream channel.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

Systems and methods consistent with the principles of the invention may provide a dedicated upstream channel for use in cable modem initialization. The dedicated upstream channel is "dedicated" such that it provides cable modem initialization opportunities, while the other remaining upstream channels provide no initialization opportunities. The remaining upstream channels may remain free to handle data communications. This leads to more efficient use of the upstream channel bandwidth.

System Configuration

Figure 1:
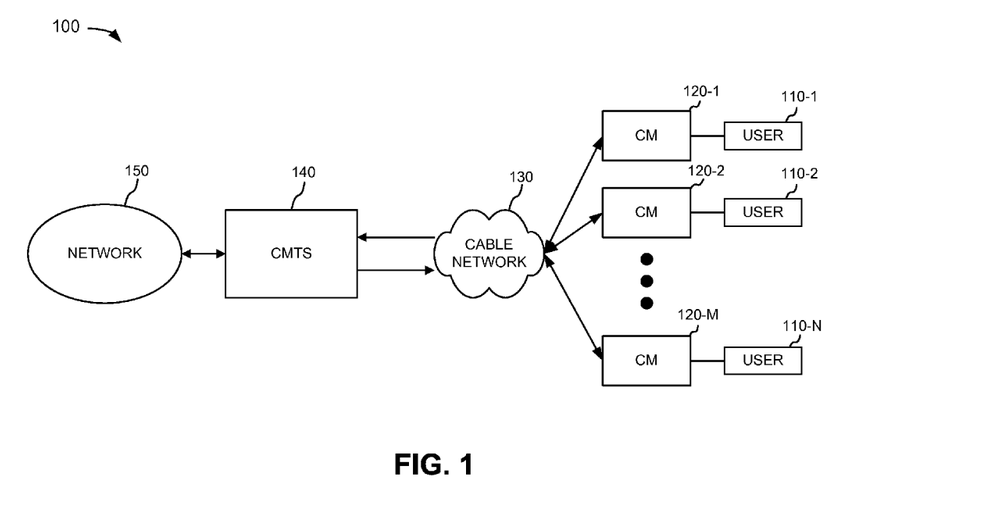
FIG. 1 is a diagram illustrating an exemplary system in which systems and methods consistent with the principles of the invention may be implemented.

FIG. 1 is a diagram illustrating an exemplary system 100 in which systems and methods consistent with principles of the invention may be implemented. System 100 may include a number of end users 110-1 through 110-N (collectively referred to as end users 110, where N≥1), a number of cable modems (CMs) 120-1 through 120-M (collectively referred to as CMs 120, where M≥1), a cable network 130, a cable modem termination system (CMTS) 140, and a network 150.

End users 110 may connect to cable network 130 through CMs 120. CMs 120 typically are installed local to end users 110. End users 110 may include a device or a network (e.g., a local area network (LAN)) of devices that may include a television, a computer, a telephone, or any other type of equipment that can receive and/or send data via cable network 130. A LAN at an end user 110 may include one or more wired networks and/or wireless networks served by, for example, a switch, router, or a computer's network interface.

CMs 120 may include devices, such as cable modems, that are available from a number of manufacturers. CMs 120 may receive data from CMTS 140 via a downstream path and send the data to one or more end users 110. CMs 120 may also transmit data to CMTS 140 via an upstream path. CMs 120 may connect with cable network 130 via coaxial cables/optical fibers. Cable network 130 may include a coaxial or hybrid optical fiber/coaxial (HFC) cable network.

CMTS 140 may facilitate communications between CMs 120 and network 150. CMTS 140 may be maintained by a cable company at a facility in relative proximity to end users 110. CMTS 140 may include a number of upstream channels (i.e., from CMs 120 to CMTS 140) and downstream channels (i.e., from CMTS 140 to CMs 120). For example, the group of CMs 120 may be served by sixteen upstream channels and four downstream channels. The downstream channels may be higher bandwidth channels than the upstream channels. CMs 120 may transmit data units, called bursts, to CMTS 140 during pre-assigned time slots.

Network 150 may include one or more networks of any type, including a Public Land Mobile Network (PLMN), Public Switched Telephone Network (PSTN), LAN, metropolitan area network (MAN), wide area network (WAN), the Internet, or an intranet.

It will be appreciated that the number of components illustrated in FIG. 1 is provided for explanatory purposes only. A typical system may include more or fewer components than are illustrated in FIG. 1.

Exemplary Upstream/Dowstream Communication

Figure 2:
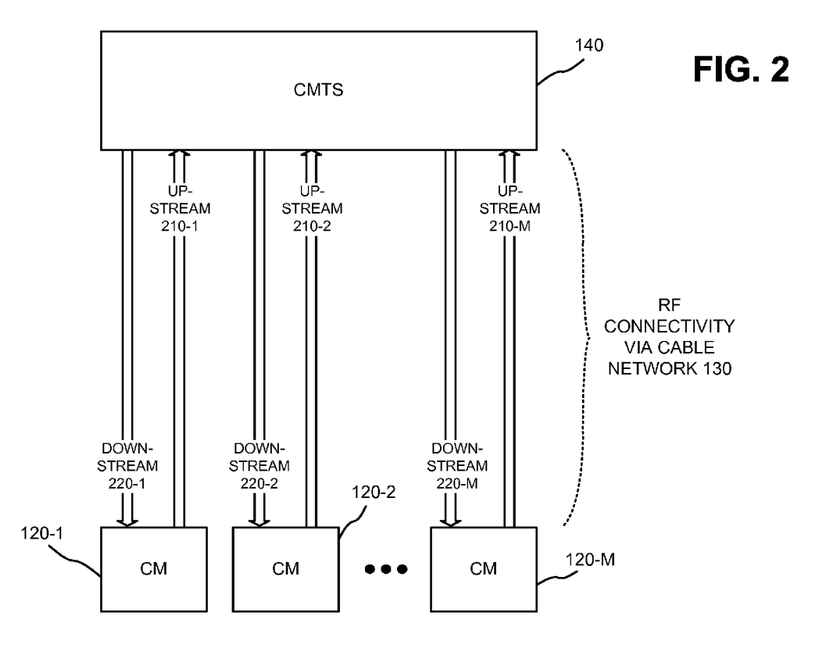
FIG. 2 is a diagram of exemplary upstream/downstream communications between a CMTS and multiple CMs in the system of FIG. 1 according to an implementation consistent with the principles of invention.

FIG. 2 illustrates exemplary upstream and downstream communication between a CMTS 140 and multiple CMs 120 according to an implementation consistent with the principles of the invention. As illustrated in FIG. 2, CMTS 140 and CMs 120 interconnect via upstream radio frequency (RF) channels 210-1 through 210-M (collectively referred to as upstream channels 210) and downstream RF channels 220-1 through 210-M (collectively referred to as downstream channels) of cable network 130 that may be implemented on a common physical communication channel, such as hybrid fiber/coax (HFC). While FIG. 2 shows M upstream channels 210, M downstream channels 220, and M CMs 120, this is for illustrative purposes only. In practice, the number of upstream channels 210, downstream channels 220, and CMs 120 may differ.

CMTS 140 may transmit data (including packet and/or non-packet data) to each CM 120 on a downstream channel 220 and may receive data (including packet and/or non-packet data) from each CM 120 via an upstream channel 210. Each upstream channel 210 and downstream channel 220 may be associated with a different frequency.

Each upstream channel 210 may further include multiple "virtual" channels. Each virtual upstream channel may include a multiplexed timeslot of the upstream channel frequency. Each virtual upstream channel may further be associated with different transmission characteristics of CMs 120. Such different transmission characteristics may include a different channel profile, such as different time-division multiplexed (TDM) timeslot size, symbol rate, frequency, preamble pattern, and/or burst profile. The different burst profile may include a different modulation, preamble length, data block size (e.g., Reed-Solomon block size), error correction (e.g., Reed-Solomon error correction), scrambling or encryption, encoding (e.g., differential encoding), maximum burst size, and/or guard time size. Upstream channels 210 from CMs 120 may, thus, include frequency bandwidth divided into multiple channels, with each channel possibly being further time division multiplexed into multiple virtual upstream channels.

Exemplary Cable Modem Termination System

Figure 3:
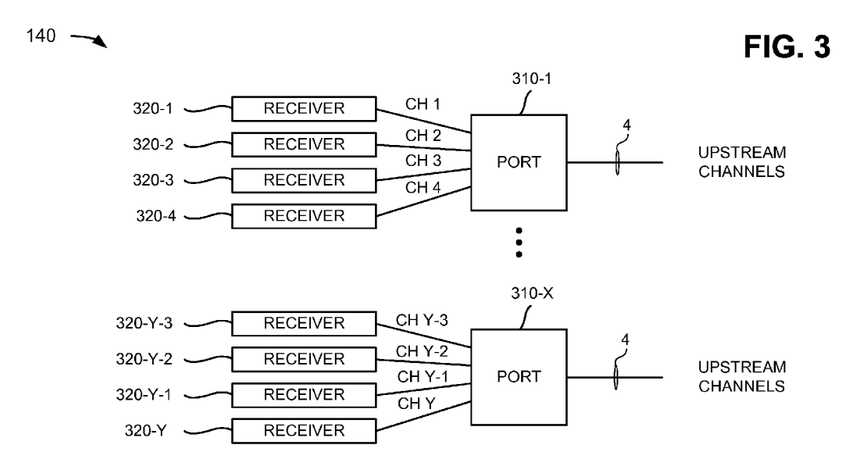
FIG. 3 is an exemplary diagram of a portion of the CMTS according to an implementation consistent with the principles of invention.

FIG. 3 is an exemplary diagram of a portion of CMTS 140 according to an implementation consistent with the principles of the invention. For ease of explanation, only certain portions of CMTS 140 involved in upstream communications are illustrated. Other portions involved with, for example, scheduling and defining burst profiles, and conducting downstream communications, are not shown, but would be understood by those skilled in the field of cable modem systems.

CMTS 140 may include a number of physical input ports 310-1 through 310-X (collectively referred to as input ports 310, where X≥1) connected to a number of receivers 320-1 through 320-Y (collectively referred to as receivers 320, where Y≥X). Each of input ports 310 may connect to one or more upstream channels, operating at different frequencies, on which a CM 120 can communicate. In the implementation shown in FIG. 3, each of input ports 310 connects to four upstream channels. In other implementations, each of input ports 310 may connect to more or fewer upstream channels (e.g., sixteen upstream channels).

Receivers 320 may connect to input ports 310 to receive data communicated over the corresponding upstream channels. Receivers 320 may correspond to the number of different upstream channels to which the corresponding input ports 310 connect. In the implementation shown in FIG. 3, the number of receivers 320 corresponding to each of input ports 310 equals four. In other implementations, more or fewer receivers 320 may connect to each of input ports 310 (e.g., sixteen receivers 320).

As shown in FIG. 3, receiver 320-1 may process data transmitted on channel 1 (CH 1); receiver 320-2 may process data transmitted on channel 2 (CH 2); receiver 320-3 may process data transmitted on channel 3 (CH 3); and receiver 320-4 may process data transmitted on channel 4 (CH 4). Likewise, receiver 320-Y-3 may process data transmitted on channel Y-3 (CH Y-3); receiver 320-Y-2 may process data transmitted on channel Y-2 (CH Y-2); receiver 320-Y-1 may process data transmitted on channel Y-1 (CH Y-1); and receiver 320-Y may process data transmitted on channel Y (CH Y).

In an implementation consistent with the principles of the invention, a dedicated upstream channel at each input port 310 may be used for initialization of CMs 120. For example, channel 1 may be used for CM initialization at input port 310-1 and channel Y-3 may be used for CM initialization at input port 310-X. The remaining channels (e.g., channels 2-4 and channels Y-2-Y) may be filled as completely as possible with data communication, such as VoIP traffic.

Figure 4A:
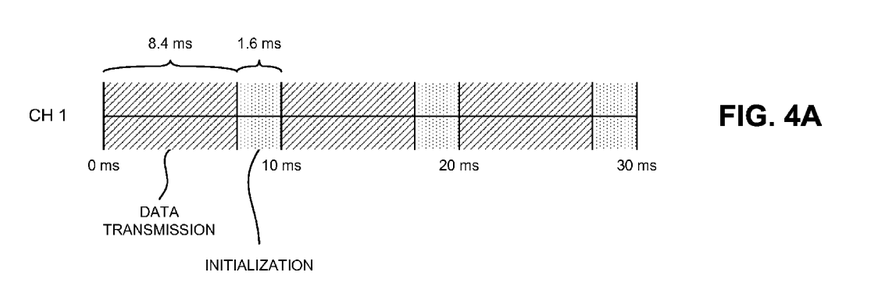
FIGS. 4A and 4B illustrate exemplary communication according to an implementation consistent with the principles of the invention.
Figure 4B:
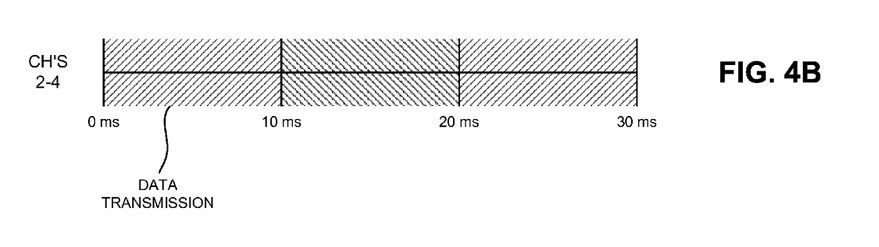

FIGS. 4A and 4B illustrate exemplary communication according to an implementation consistent with the principles of the invention. FIG. 4A illustrates exemplary communication on channel 1 of input port 310-1 and FIG. 4B illustrates exemplary communication on channels 2-4 of input port 310-1.

As shown in FIG. 4A, communication on channel 1 includes data transmissions and CM initialization opportunities. For example, CMTS 140 may allocate approximately 1.6 ms for CM initialization during each 10 ms interval. The remaining 8.4 ms can be used for other traffic, such as VoIP. In other words, approximately 16% of each 10 ms interval may be used to offer CM initialization opportunities and the other 84% of the interval can be used for other purposes, such as data communication traffic. CMs 120 may use these initialization opportunities to transmit data, such as registration packets, associated with CM initialization.

As shown in FIG. 4B, communication on channels 2-4 includes data transmissions and no CM initialization opportunities. In other words, approximately 100% of each 10 ms interval may be used for data transmissions on channels 2-4.

Exemplary Processing

Figure 5:
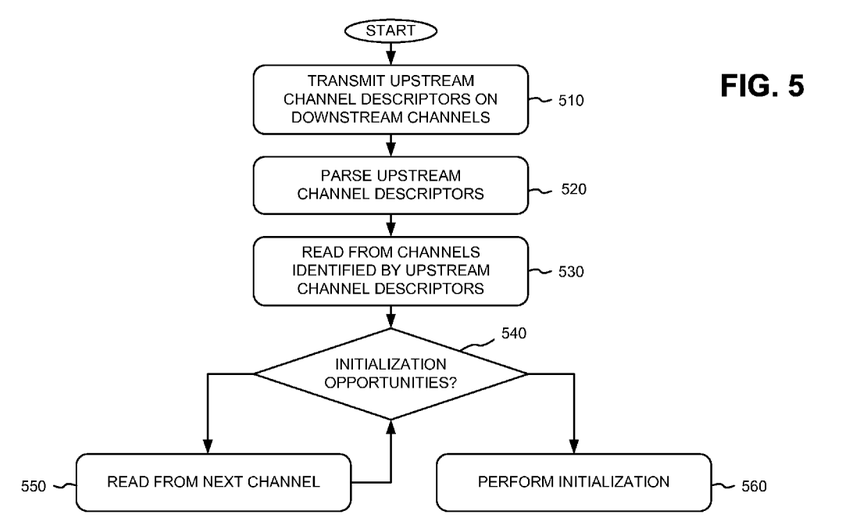
FIG. 5 is a flowchart of exemplary processing for performing CM initialization according to an implementation consistent with the principles of the invention.

FIG. 5 is a flowchart of exemplary processing for performing CM initialization according to an implementation consistent with the principles of the invention. For CM initialization, CMTS 140 may transmit upstream channel descriptors on every downstream channel (act 510). An upstream channel descriptor may include an upstream channel identifier, which uniquely identifies one of the upstream channels, and related physical characteristics.

In one implementation, CMTS 140 may transmit upstream channel descriptors that identify all of the upstream channels at approximately the same rate. In other words, CMTS 140 may send out an approximately equal number of upstream channel descriptors relating to each of the upstream channels. Only one of these upstream channels, however, may be dedicated to offering initialization opportunities.

In another implementation, CMTS 140 may transmit more upstream channel descriptors that identify the upstream channel that offers CM initialization opportunities than the upstream channels that do not offer CM initialization opportunities. For example, with regard to CMTS 140 illustrated in FIG. 3, CMTS 140 may transmit more upstream channel descriptors that identify channel 1 than upstream channel descriptors that identify channels 2-4.

When a CM 120 connects to cable network 130, it attempts to read from one of the downstream channels. CM 120 parses the upstream channel descriptors on the downstream channel (act 520). For example, CM 120 may examine an upstream channel identifier and the related physical characteristics in an upstream channel descriptor. CM 120 may then read from the upstream channel identified by the upstream channel identifier (act 530).

If the upstream channel does not offer initialization opportunities (e.g., the channel corresponds to one of channels 2-4), then CM 120 may read from the upstream channel identified by the upstream channel identifier in the next upstream channel descriptor (acts 540 and 550). If the upstream channel offers initialization opportunities, then CM 120 may initialize in a conventional manner (acts 540 and 560). For example, CM 120 may transmit certain initialization information, such as a registration packet, to CMTS 140 to facilitate initialization.

In the case where CMTS 140 sends out an approximately equal number of upstream channel descriptors corresponding to the different upstream channels, CM 120 may need to read from one or more upstream channels before locating the one upstream channel that offers initialization opportunities. In the case where CMTS 140 sends out more upstream channel descriptors corresponding to the upstream channel that offers initialization opportunities, CM 120 is more likely to read from this upstream channel in the first instance.

Alternative Cable Modem Termination System Configurations

It has been previously described that an upstream channel associated with each input port 310 offers initialization opportunities to connected CMs 120. In other implementations consistent with the principles of the invention, a single upstream channel may offer initialization opportunities for multiple input ports 310.

Figure 6:
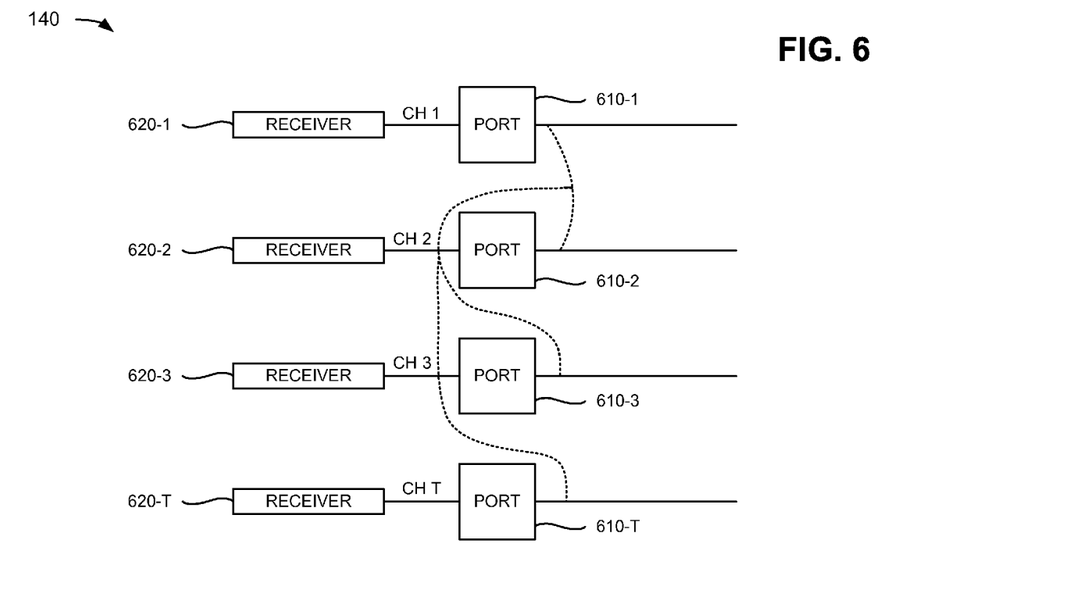
FIG. 6 is an exemplary diagram of a portion of the CMTS according to another implementation consistent with the principles of the invention.

FIG. 6 is an exemplary diagram of a portion of CMTS 140 according to another implementation consistent with the principles of the invention. According to this implementation, CMTS 140 may include input ports 610-1 through 610-T (collectively referred to as input ports 610, where T≥1) and receivers 620-1 through 620-T (collectively referred to as receivers 620). Each of input ports 610 may serve a different group of CMs 120.

There may be a one-to-one correspondence between input ports 610 and receivers 620. For example, receiver 620-1 may process data transmitted on channel 1 (CH 1); receiver 620-2 may process data transmitted on channel 2 (CH 2); receiver 620-3 may process data transmitted on channel 3 (CH 3); and receiver 620-T may process data transmitted on channel T (CH T).

In this implementation, channel 1 may be dedicated for CM initialization. Channel 1 may connect a fraction of the time to the other input ports of CMTS 140 (e.g., input ports 610-2 through 610-T). In this manner, channel 1 may provide CM initialization opportunities to CMs 120 connected to input ports 610-2 through 610-T, in addition to CMs 120 connected to input port 610-1. This permits receivers 620-2 through 620-T to operate almost exclusively on data transmissions, instead of spending a portion of their time performing CM initialization.

Figure 7:
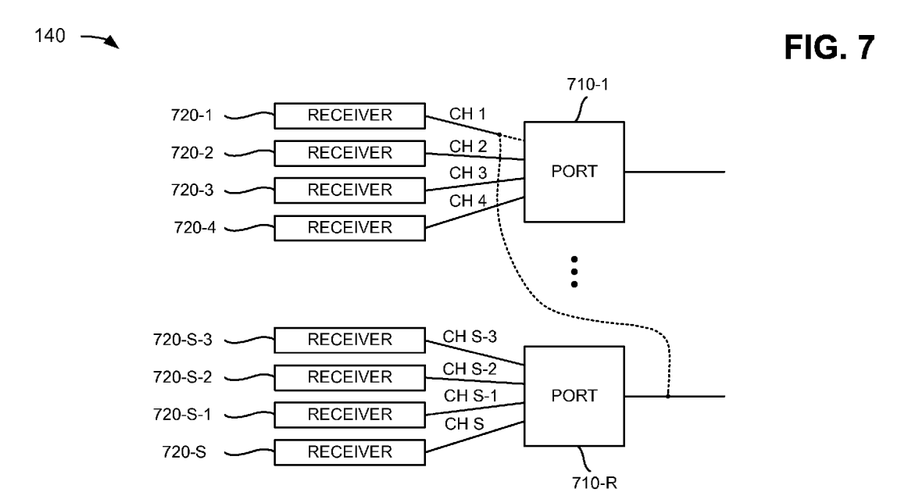
FIG. 7 is an exemplary diagram of a portion of the CMTS according to yet another implementation consistent with the principles of the invention.

FIG. 7 is an exemplary diagram of a portion of CMTS 140 according to yet another implementation consistent with the principles of the invention. According to this implementation, CMTS 140 may include input ports 710-1 through 710-R (collectively referred to as input ports 710, where R≥1) and receivers 720-1 through 720-S (collectively referred to as receivers 720, where S≥R). Each of input ports 710 may serve a different group of CMs 120.

One or more receivers 720 may connect to each of input ports 710. For example, receiver 720-1 may process data transmitted on channel 1 (CH 1); receiver 720-2 may process data transmitted on channel 2 (CH 2); receiver 720-3 may process data transmitted on channel 3 (CH 3); and receiver 720-4 may process data transmitted on channel 4 (CH 4). Likewise, receiver 720-S-3 may process data transmitted on channel S-3 (CH S-3); receiver 720-S-2 may process data transmitted on channel S-2 (CH S-2); receiver 720-S-1 may process data transmitted on channel S-1 (CH S-1); and receiver 720-S may process data transmitted on channel S (CH S).

In this implementation, channel 1 may be dedicated for CM initialization. Channel 1 may connect a fraction of the time to the other input ports of CMTS 140 (e.g., input port 710-R). In this manner, channel 1 may provide CM initialization opportunities to CMs 120 connected to input port 710-R, in addition to CMs 120 connected to input port 710-1. This permits receivers 720-2 through 720-S to operate almost exclusively on data transmissions, instead of spending a portion of their time performing CM initialization.

CONCLUSION

Systems and methods consistent with the principles of the invention efficiently use the bandwidth on the upstream channels of a cable modem system. For example, the systems and methods provide a dedicated upstream channel for use in cable modem initialization, thereby leaving the remaining upstream channels free to handle data communications.

The foregoing description of embodiments of the present invention provides illustration and description, but is not intended to be exhaustive or to limit the invention to the precise form disclosed. Modifications and variations are possible in light of the above teachings or may be acquired from practice of the invention.

For example, it was previously described that a single upstream channel is dedicated to providing CM initialization opportunities. In other implementations, more, but less than all, upstream channels may provide CM initialization opportunities.

Also, although the description used specific numbers of channels, input ports, and receivers, these numbers are purely exemplary. The numbers of channels, input ports, and receivers in CMTS 140 may be less than or greater than the specific numbers described.

While a series of acts has been described with regard to FIG. 5, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method comprising:
   determining, by a network device, whether a first upstream channel, of a plurality of upstream channels, comprises a first type of upstream channel or a second type of upstream channel,
      the first type of upstream channel providing initialization opportunities,
      the second type of upstream channel providing no initialization opportunities, and
      data being provided via the second type of upstream channel while the first type of upstream channel provides the initialization opportunities;
   initializing, by the network device and when the first upstream channel comprises the first type of upstream channel, the network device;
   determining, by the network device and when the first upstream channel comprises the second type of upstream channel, whether a second upstream channel, of the plurality of upstream channels, comprises the first type of upstream channel based on an upstream channel descriptor corresponding to the second upstream channel,
      the upstream channel descriptor being received by the network device via a downstream channel; and
   initializing, by the network device and when the second upstream channel comprises the first type of upstream channel, the network device.

2. The method of claim 1, where only one of the plurality of upstream channels comprises the first type of upstream channel.

3. The method of claim 1, where at least two, but fewer than all, of the plurality of upstream channels comprise the first type of upstream channel.

4. The method of claim 1, further comprising:
receiving a plurality of descriptors,
the plurality of descriptors including the upstream channel descriptor, and
reading the second upstream channel based the upstream channel descriptor.

5. The method of claim 4, where the plurality of descriptors include an equal quantity of descriptors corresponding to the first type of upstream channel and the second type of upstream channel.

6. The method of claim 4, where the plurality of descriptors include a first quantity of descriptors corresponding to the first type of upstream channel that is greater than a second quantity of descriptors corresponding to the second type of upstream channel.

7. The method of claim 1, where initializing the network device includes:
transmitting a registration packet via the first type of upstream channel.

8. A system comprising:
at least one device to:
determine whether a first upstream channel, of a plurality of upstream channels, comprises a first type of upstream channel or a second type of upstream channel,
the first type of upstream channel providing initialization opportunities,
the second type of upstream channel providing no initialization opportunities, and
data being provided via the second type of upstream channel while the first type of upstream channel provides the initialization opportunities,
initialize, when the first upstream channel comprises the first type of upstream channel, the at least one device,
determine, when the first upstream channel comprises the second type of upstream channel, whether a second upstream channel, of the plurality of upstream channels, comprises the first type of upstream channel based on an upstream channel descriptor corresponding to the second upstream channel,
the upstream channel descriptor being received by the at least one device via a downstream channel, and
initialize, when the second upstream channel comprises the first type of upstream channel, the at least one device.

9. The system of claim 8,
where the at least one device is further to:
receive a plurality of descriptors,
the plurality of descriptors including the upstream channel descriptor, and
where, when determining whether the second upstream channel comprises the first type of upstream channel, the at least one network device is to:
read the second upstream channel based on the upstream channel descriptor.

10. The system of claim 9, where the descriptors include an equal number of descriptors corresponding to each of the first type of upstream channel and the second type of upstream channel.

11. The system of claim 9, where the descriptors include a first quantity of descriptors corresponding to the first type of upstream channel that is greater than a second quantity of descriptors corresponding to the second type of upstream channel.

12. The system of claim 8, where, when initializing the at least one device, the at least one device is to:
transmit a registration packet via the first type of upstream channel.

13. The system of claim 8,
where the at least one device comprises a cable modem, and
where, when initializing the cable modem, the cable modem is to:
transmit a registration packet to a cable modem termination system.

14. The method of claim 8, where only one of the plurality of upstream channels comprises the first type of upstream channel.

15. A system comprising:
one or more processors are to:
receive first data over a first plurality of upstream channels from a first group of downstream devices,
the first plurality of upstream channels including a first upstream channel and one or more first different upstream channels;
receive second data over a second plurality of upstream channels from a second group of downstream devices,
the second plurality of upstream channels including a second
upstream channel and one or more second different upstream channels;
process third data transmitted over the first upstream channel and the second upstream channel,
the third data including a portion of the first data and a portion of the second data,
the first data transmitted over the first upstream channel including initialization opportunities associated with the first group of downstream devices, and
the second data transmitted over the second upstream channel including initialization opportunities associated with the second group of downstream devices; and
transmit, via a downstream channel and to a particular device of the first group of downstream devices, an upstream channel descriptor corresponding to the first upstream channel.

16. The system of claim 15, where the system comprises a cable modem termination system.

17. The system of claim 15,
where the system includes a receiver, a first input port, and a second input port,
where the receiver processes the third data, and
where the receiver selectively connects to the input port to process the portion of the first data transmitted over the first upstream channel and selectively connects to the second input port to process the portion of the second data transmitted over the second upstream channel.

18. The system of claim 15,
where the system transmits a plurality of upstream channel descriptors, corresponding to the first plurality of upstream channels and the second plurality of upstream channels, to the first group of downstream devices and the second group of downstream devices,
where the plurality of upstream channel descriptors include an upstream channel descriptor, and
where the one or more processors are to:

receive initialization opportunities over the first upstream channel and the second upstream channel based on transmitting the plurality of upstream channel descriptors.

19. The system of claim 18, where each of the first group of downstream devices receive an equal number of the plurality of upstream channel descriptors, and where each of the second group of downstream devices receive an equal number of the plurality of upstream channel descriptors.

20. The system of claim 18, where a first quantity of the plurality of upstream channel descriptors corresponding to the first upstream channel is greater than a second quantity of the plurality of upstream channel descriptors corresponding to another upstream channel of the one or more first different upstream channels.

* * * * *